United States Patent [19]

Thome et al.

[11] Patent Number: 5,100,636
[45] Date of Patent: Mar. 31, 1992

[54] METHOD FOR THE PREPARATION OF CRYSTALLINE AND ZEOLITIC ALUMINOSILICATES

[75] Inventors: Roland Thome; Arno Tissler, both of Bonn, Fed. Rep. of Germany

[73] Assignee: Vereinigte Aluminium-Werke A.G., Bonn, Fed. Rep. of Germany

[21] Appl. No.: 535,918

[22] Filed: Jun. 11, 1990

[30] Foreign Application Priority Data

Jun. 14, 1989 [DE] Fed. Rep. of Germany ....... 3919400

[51] Int. Cl.$^5$ ............................................. C01B 33/34
[52] U.S. Cl. ...................................... 423/328; 423/326
[58] Field of Search ............... 423/328, 329, 330, 331; 502/64

[56] References Cited

U.S. PATENT DOCUMENTS

| 3,702,886 | 11/1972 | Argauer et al. .................. 423/328 |
| 4,687,654 | 8/1987 | Taramasso et al. ................. 423/329 |
| 4,818,509 | 4/1989 | Dwyer et al. ..................... 423/329 |

FOREIGN PATENT DOCUMENTS

| 150256 | 7/1984 | Fed. Rep. of Germany . |
| 0206551 | 2/1984 | German Democratic Rep. ..................... 423/328 |
| 0207186 | 2/1984 | German Democratic Rep. ..................... 423/328 |

OTHER PUBLICATIONS

P.A. Jacobs et al.: "Studies in surface science and catalysis", vol. 33, Synthesis of high-silica aluminosilicate zeolites, 1987, Elsevier, Amsterdam, pp. 113, 134–146.

*Primary Examiner*—R. Bruce Breneman
*Attorney, Agent, or Firm*—Darby & Darby

[57] ABSTRACT

Disclosed herein is a method of preparing crystalline, zeolitic aluminosilicates with $SiO_2/Al_2O_3$ ratios of 20 or more. The method provides a two-stage crystallization process which avoids the formation of secondary crystalline phases. The first stage is conducted at a temperature between 240° C. and 325° C. for between about 1 and 20 minutes. The second stage is conducted in an open vessel at a temperature between about 50° C. and 100° C. for about 40 to 240 hours.

14 Claims, 1 Drawing Sheet

METHOD FOR THE PREPARATION OF CRYSTALLINE AND ZEOLITIC ALUMINOSILICATES

FIELD OF THE INVENTION

The present invention relates to a method for the preparation of crystalline, zeolitic aluminosilicates with a molar ratio of $SiO_2:Al_2O_3$ of $\geq 20$. More particularly, the zeolitic aluminosilicates are prepared from a reaction formulation containing $SiO_2$ and $Al_2O_3$ or their hydrated derivatives or alkali silicates and aluminates, mineralizators, seeding nuclei and, if necessary, organic, structure-directing ammonium compounds in an aqueous, alkaline medium.

BACKGROUND OF THE INVENTION

Pentasil-zeolites are defined by their structure type, and more specifically by their XRD. ZSM-5 is the trade name of a pentasil-zeolite.

As early as 1967, Argauer and Landolt (U.S. Pat. No. 3,702,886) worked out parameters for the synthesis of pentasilzeolites, particularly those relating to the following molar ratios:

$OH^-/SiO_2 = 0.07 - 10$ $SiO_2/Al_2O_3 = 5 - 100$ $H_2O/SiO_2 = 1 - 240$

However, the Argauer and Landolt procedure succeeded in synthesizing a reasonably pure phase ZSM-5 zeolite only if organic amines with a structure-giving function (i.e. template function), such as tetrapropyleneammonium compounds were used.

Subsequent to the publication of the Argauer and Landolt patent, various publications have disclosed methods of conducting the synthesis of pentasil-zeolites without requiring the very expensive, toxic and easily inflammable organic amine templates. Still other subsequent publications have disclosed substitutes for these amines. In addition to their expense, toxicity and flammability, such amines are disfavored because they are subject to thermal decomposition which can destroy the zeolite structure. Further publications have disclosed modifications of the Argauer and Landolt process directed towards improving the reactivity of the $SiO_2$ and $Al_2O_3$ starting materials.

For example, German Offenlegungsschrift 34 02 842 discloses a method wherein a specially aged aluminosilicate (which is still, however, amorphous to X-rays) is used as a nucleating gel. The method avoids the use of organic amine templates.

EP 0 111 748 discloses aluminosilicates having a zeolite structure and methods for their preparation. The zeolite synthesis is carried out without the addition of an organic compound, but in the presence of aluminum phosphate. However, this method results in zeolites which contain phosphate.

Under normal conditions, the synthesis of zeolites without the use of organic compounds proceeds very slowly. Accordingly, there are no large-scale methods that do not use organic templates for the preparation of high-silica aluminosilicates having a pentasil structure (see *Synthesis of High-Silica Aluminosilicate Zeolites*, by P. A. Jacobs and J. A. Martens, *Studies in Surface Science Catalysis* 33, 1987, p.143; and *Zeolites as Catalysts, Sorbents and Detergent Builders*, H. G. Karge and J. Weithamp, *Studies in Surface Science Catalysis*, 46, 1989, p.654).

It is also known that formation of aluminosilicates, build-up of the zeolite crystal lattice from $SiO_4^-$ and $AlO_4^-$ tetrahedra, nucleation of zeolites, and zeolite crystal growth all take place by way of reversible reactions. These processes depend on chemical equilibria, which can shift in different directions depending on the temperature, the hydrothermal pressure relationships and the concentrations of reactants (e.g. supersaturated or unsaturated). It is desirable to have a reaction, which can be carried out largely under pressureless conditions and to achieve as complete a reaction as possible to the crystalline aluminosilicate, while avoiding, on the one hand, possible secondary phases (such as cristobalite) and, on the other, on amorphous phase.

High temperatures (i.e., temperatures in excess of 200° C.), and consequent high reaction rates, are advantageous for the formation of crystalline aluminosilicate. However, high temperatures (in excess of 200° C.) increase the probability of forming secondary phases.

OBJECT OF THE INVENTION

It is therefore an object of the present invention to provide a method, conducted under substantially atmospheric pressure, for the preparation of crystalline, zeolitic aluminosilicates with a $SiO_2:Al_2O_3$ molar ratio of $\geq 20$ by means of hydrothermal crystallization and without the use of organic compounds. This method can be carried out on an industrial scale and yields an crystalline aluminosilicate product which is free of secondary crystalline phases.

SUMMARY OF THE INVENTION

The present invention relates to a method for preparing crystalline zeolite aluminosilicates. The method includes the step of forming a reactant suspension with the following reactant proportions $SiO_2/Al_2O_3$ 20 to 60

$OH^-/SiO_2$ 0.10 to 0.20

$H_2O/SiO_2$ 20 to 60;

The reactant suspension is mixed and heated to a first temperature of between about 245° C. and about 325° C. to form a crystallization broth.

The crystallization broth is maintained at the first temperature for between about 1 and about 20 minutes. The crystallization broth is then cooled to a second temperature of between about 50° C. and about 100° C. The broth is then held in an open vessel at the second temperature for between about 40 and about 240 hours. A crystalline zeolite aluminosilicate is thereafter recovered from the broth.

DETAILED DESCRIPTION OF THE INVENTION

Figure 1:
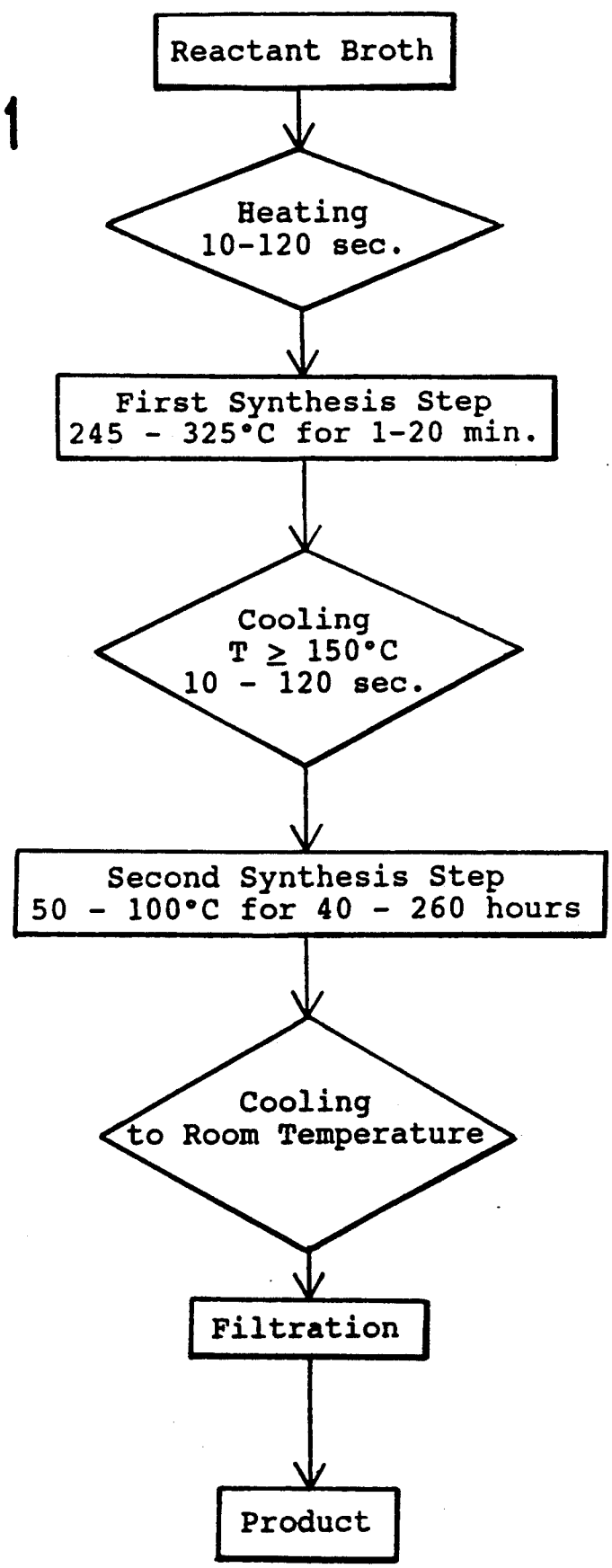
FIG. 1 shows, in outline form, a preferred embodiment of the zeolite synthesis method of the present invention.

It has now been ascertained that a method for the crystallization of aluminosilicate under substantially atmospheric pressure is available. The method avoids the formation of unwanted secondary phases by using a procedure having two crystallization steps.

For the first step, the reactants (including water glass, solutions of aluminum sulfate and sodium sulfate, and sulfuric acid) are mixed and heated to between about 245° C. and about 325° C. The admixture and heating are is performed under turbulent flow conditions (Reynolds number greater than 2000 and preferably about 50,000 or higher) to form a crystallization broth. Turbulent flow accelerates mixing and heat transfer, thereby minimizing crystallizations that occur before the preferred temperature and mixture of reactants is obtained. The admixture of the initial reactant suspension can be performed discontinuously (as a batch) prior to heating to form a crystallization broth. (The start of the crystallization step requires the mixture to be at a temperature in excess of about 100° C.) The batch suspension can be stored for up to 14 days and thereafter subjected to the high temperature, high pressure, first crystallization step. The initial mixing step can also be performed in a static apparatus and the mixture immediately thereafter subjected to the first crystallization step (comprising exposure to high temperature—high pressure conditions). The mixing and storage of the initial reactant suspension has to be done at temperatures below 100 Celsius, preferably at temperatures between 50° and 70° C. at atmospheric pressure with the pH between 10 and 12.

After heating and mixing the reactants under turbulent flow conditions, a first crystallization step is carried out by maintaining the broth at a predetermined broth temperature (between about 245° C. and about 325° C.) for between about 1 and about 20 minutes. The first crystallization step is conducted in apparatus that can withstand high temperature (245° C.–325° C.) and high pressure (60–150 bar) that are encountered. This step is performed in an autoclave or a tube reactor (such as described in assignee's U.S. Pat. Nos. 3,497,317 and 4,361,541). At the conclusion of the first crystallization step the temperature of the crystallization broth is reduced (preferably by at least 150° C.) until the temperature of the second crystallization step is achieved. The preferred temperature range of the reactant mixture for the second crystallization step is between about 50° C. and about 100° C. The second crystallization step is generally carried out in an open vessel. The second step crystallization conditions (temperature 50°–100° C., pressure 1 atm.; slow stirring e.g. 0.4–4 Hz) are maintained for between about 40 and about 240 hours. After the second crystallization step has been concluded, the crystallization broth is cooled to about room temperature, filtered, and an aluminosilicate material containing crystalline aluminosilicate is recovered.

Preferably, the first crystallization step is initiated by mixing and heating the reactants, within about 10 seconds and about 120 seconds, from ambient temperature to a temperature between about 250° and 325° C. After being held for between about 5 and about 15 minutes at the maximum temperature selected in this range, the crystallization broth is rapidly cooled (within about 1 minute) from the initial crystallization step temperature to a temperature below 100° C.

The preferred mode of operation of the method of the present invention is described in greater detail as follows:

A reactant suspension of, for example, water glass, aluminum sulfate, sodium sulfate and sulfuric acid, having the following molar proportions $SiO_2/Al_2O_3$ 20 to 60

$OH^-/SiO_2$ 0.10 to 0.20

$H_2O/SiO_2$ 20 to 60 is supplied to the receiving well of a piston diaphragm pump. The reactant suspension materials can be mixed as a batch, the batch stored for up to 14 days, and thereafter subjected continuously to the high pressure, high temperature first crystallization step. The pump delivers the reactant suspension into a pipe system consisting of several heat exchangers (usually 3 or 4), which are designed so that the designated amount of suspension can be heated in about 10 seconds to about 120 seconds from an ambient temperature of about 17° C. to 300° C. High-pressure steam, heated thermal oil, and salt may serve as the heat source. Hitec brand salt (Dupont) is an example of a form of salt that may be used as the heat source in the invention. Electrical heating can also be used as the heat source for the heat exchangers. After mixing and heating in the pipe system, the reactant suspension forms a crystallization broth in which the crystallization process has begun.

After exposure to the heat exchangers, the crystallization broth moves into a pipe segment having a predetermined length. The length of the pipe segment is sufficient to ensure that the crystallization broth has a residence time of between about 5 and about 15 minutes at the first crystallization step temperature (245° C. to 325° C.). The pipe diameter (for both the pipe segment and the heat exchanger pipe system) is selected so that turbulent flow of the crystallization broth is obtained at the specified pressures and flow rate. In general, pipe diameters of between 1 and 35 cm are employed. The pipe segment and heat exchanger pipe system generally have a total length of between 1000 and 5000 meters.

After passing through the pipe segment and undergoing the first crystallization step, the crystallization broth is cooled, either by relieving the pressure or by heat exchange, to the temperature desired for the second crystallization step (50° C. to 100° C.). Further crystal growth occurs during this second crystallization step. The second crystallization step is conducted in an open vessel (at atmospheric pressure) for between about 60 hours and about 240 hours. Preferably, the crystallization broth is stirred during the second crystallization step.

To achieve optimum crystallinity, up to 500% by weight of crystallization nuclei (based on $SiO_2$ in the initial reactant suspension) is added to the crystallization broth at the start of the second crystallization step. Crystallization nuclei (up to 500% w/w $SiO_2$) may also be added to the initial reactant suspension. The crystallization nuclei comprise pentasil-zeolite crystals, e.g. the product of Example 1 below.

Pipe diameters and flow rates required to give turbulent flow, for suspensions such as those described above, are known. The level of turbulence that has been found to be useful in practicing the mixing and heating process of the present invention is characterized by a Reynolds number of about $2 \times 10^3$ or more, preferably $5 \times 10^4$ or more.

A flow diagram illustrating the method of the present invention is shown in FIG. 1.

The invention is explained in greater detail in the following examples illustrate the operation of the invention.

EXAMPLE 1

A reactant suspension composed of solutions of Na water glass, aluminum sulfate, sodium sulfate and sulfuric acid with the molar proportions of $SiO_2/Al_2O_3 = 27$ $OH^-/SiO_2 = 0.14$ $H_2O/SiO_2 = 30$ and having a temperature of 60° C. was supplied continuously (at a rate of 3 m$^3$/h) from a reservoir of a piston pump. This reaction formulation was heated within 1 minute to 270° C. in a pipe system having 3 heat exchangers to form a crystallization broth. After a residence time of 10 minutes at this temperature in a residence-time pipe segment, the crystallization broth was cooled to 95° C. Subsequently the crystallization broth was placed in open vessels and stirred at a constant temperature of 95° C. for 60 hours.

The crystallization broth was then filtered and a filter cake containing 30% pentasil zeolites was recovered. Aside from amorphous portions, no further secondary crystalline phases were present in the filter cake.

EXAMPLE 2

A reactant suspension composed of solutions of Na water glass, aluminum sulfate, sodium sulfate and sulfuric acid with the molar proportions of $SiO_2/AlO_3 = 27$ $OH^-/SiO_2 = 0.14$ $H_2O/SiO_2 = 30$ and having a temperature of 60° C. was pumped continuously (at a rate of 3 m$^3$/h) from the reservoir of a piston pump. Within 1 minute the suspension was heated to 270° C. in a pipe system having 3 heat exchangers to form a crystallization broth. After a residence time of 10 minutes at this temperature in a residence-time pipe segment, the crystallization broth was cooled to 95° C. Subsequently, the crystallization broth was placed in several open vessels. The product of Example 1 was added to the open vessels to provide crystallization nuclei (add 100% by weight based on SiO$_2$ in the initial reactant suspension). The crystallization broth was then stirred and the temperature was kept at a constant 95° C. for 60 hours.

The crystallization both was then filtered and a filter cake containing 80% pentasil zeolites was recovered. Aside from amorphous portions, no secondary crystalline phases were present in the filter cake.

EXAMPLE 3

The product of Example 1 was added (2% by weight/100% weight of SiO$_2$ in solution), to a reactant suspension composed of solutions of Na water glass, aluminum sulfate, sodium sulfate and sulfuric acid with the molar proportions of $SiO_2/Al_2O_3 = 27$ $OH^-/SiO_2 = 0.14$ $H_2O/SiO_2 = 30$ and having a temperature of 60° C. The Example 1 product was added to provide crystallization nuclei. This reactant suspension was fed continuously (at 3 m$^3$/h) from the receiver container of a piston pump to a pipe system having 3 heat exchangers and heated within 1 minute to 270° C. to form a crystallization broth. After a residence time of 10 minutes at this temperature in a residence-time segment of the pipe system, the broth was cooled at 95° C. Subsequently the crystallization broth was placed in open vessels and stirred at a temperature of 95° C. for 60 hours.

The crystallization broth was then filtered and a filter cake containing 50% pentasil zeolites was obtained. Aside from amorphous portions, no further secondary crystalline phases were present in the filter cake.

EXAMPLE 4

The product recovered in Example 1 was added (2% w/100% weight of SiO$_2$) to a reactant suspension composed of solutions of Na water glass, aluminum sulfate, sodium sulfate and sulfuric acid with the molar proportions of $SiO_2/Al_2O_3 = 27$ $OH^-/SiO_2 = 0.14$ $H_2O/SiO_2 = 30$ and having a temperature of 60° C. The Example 1 product was added to provide crystallization Nuclei. This reactant suspension was fed continuously (at 3 m3/h) from the receiver container of a piston pump to a pipe system having 3 heat exchangers and heated within 1 minute to 270° C. to form a crystallization broth. After a residence time of 10 minutes at this temperature in a residence-time segment of the pipe system, the broth was cooled to 95° C. Subsequently, the crystallization broth was placed in open vessels and stirred. The product of Example 1 was also added to the open vessels to provide crystallization nuclei (100% by weight based on SiO$_2$ in the initial reactant suspension was added). The temperature was kept constant at 96° C. for 40 hours.

The crystallization broth was then filtered and a filter cake containing 80% pentasil zeolites was obtained. Aside from amorphous portions, no further secondary crystalline phases were present in the filter cake.

EXAMPLE 5

A reactant suspension composed of solutions of Na water glass, aluminum sulfate, sodium sulfate and sulfuric acid with the molar proportions of $SiO_2/Al_2O_3 = 40$ $OH^-/SiO_2 = 0.14$ $H_2O/SiO_2 = 40$ and having a temperature of 60° C. was pumped continuously (at 3 m$^3$/h) from a receiver of a piston pump to a pipe system having 3 heat exchangers. The suspension was heated within 1 minute to 270° C. to form a crystallization broth. After a residence time of 10 minutes at this temperature in a residence-time section of the pipe system, the suspension was cooled to 95° C. Subsequently, the crystallization broth was placed in several open vessels and stirred at a constant temperature of 95° C. for 60 hours.

The crystallization broth was then filtered and a filter cake containing 20% pentasil zeolites was obtained. Aside from amorphous portions, no further secondary crystalline phases were present in the filter cake.

EXAMPLE 6

A reactant suspension composed of solutions of Na water glass, aluminum sulfate, sodium sulfate and sulfuric acid with the molar proportions of $SiO_2/Al_2O_3 = 40$ $OH^-/SiO_2 = 0.14$ $H_2O/SiO_2 = 40$ and having a temperature of 60° C. was pumped continuously (at 3 m$^3$/h) from a reservoir of a piston pump to a pipe system having 3 heat exchangers. The suspension was heated within 1 minute to 270° C. to form a crystallization broth. After a residence time of 10 minutes at this temperature in a residence-time segment of the system, the suspension was cooled to 95° C. Subsequently, the crystallization broth was placed in open vessels and stirred. The product of Example 5 was added to the open vessels to provide crystallization nuclei (100% by weight of the product of Example 5 based on SiO$_2$ in the initial reactant suspension was added). The temperature was kept constant at 95° C. for 60 hours.

The crystallization broth was then filtered and a filter cake containing 70% pentasil zeolite was obtained. Aside from amorphous portions, no further secondary crystalline phases were present in the filter cake.

EXAMPLE 7

The product of Example 5 was added (2% w/100% weight of SiO$_2$) to a reactant suspension, composed of solutions of Na water glass, aluminum sulfate, sodium sulfate and sulfuric acid with the molar proportions of $SiO_2/AL_{O3} = 40$ $OH^-/SiO_2 = 0.14$ $H_2O/SiO_2 = 40$ and having a temperature of 60° C. The Example 5 product was added to provide crystallization nuclei. This reactant suspension was fed continuously (at 3 m$^3$/h) from a receiver container of a piston pump to a pipe system having 3 heat exchangers and heated within 1 minute to 250° C. to form a crystallization broth. After a residence time of 10 minutes at this temperature in a residence-time segment of the pipe system, the broth was cooled to 95° C. Subsequently, the crystallization broth was placed in open vessels and stirred at constant temperature of 95° C. for 60 hours.

The crystallization broth was then filtered and a filter cake containing 40% pentasil zeolites was obtained. Aside from amorphous portions, no further secondary crystalline phases were present in the filter cake.

EXAMPLE 8

The product of Example 5 was added (2% w/100% weight of SiO$_2$) to a reactant suspension, composed of solutions of Na water glass, aluminum sulfate, sodium sulfate and sulfuric acid with the molar proportions of $SiO_2/AL_2O_3 = 40$ $OH^-/SiO_2 = 0.14$ $H_2O/SiO_2 = 40$ and having a temperature of 60° C. This reactant suspension was fed continuously (at 3 m$^3$/h) from the receiver container of a piston pump to a pipe system having 3 heat exchangers and heated within 1 minute to 270° C. to form a crystallization broth. After a residence time of 10 minutes at this temperature in a residence-time segment of the pipe system, the broth was cooled at 95° C. Subsequently, the crystallization broth was placed in open vessels and stirred. The product of Example 1 was also added to the open vessels (100% by weight based on SiO$_2$ in the initial reactant suspension was added). The temperature was kept constant at 95° C. for 40 hours.

The crystallization broth was then filtered and a filter cake containing 80% pentasil zeolites was obtained. Aside from amorphous portions, no further secondary crystalline phases were present in the filter cake.

We claim:
1. A method for preparing crystalline zeolite aluminosilicates comprising:
forming a reactant suspension having an SiO$_2$:Al$_2$O$_3$ molar ratio of greater than 20;
mixing the reactant suspension;
heating the reactant suspension to a first crystallization temperature of between about 245° C. and about 325° C. to form a crystallization broth;
maintaining said crystallization broth at said first crystallization temperature for between about 1 and about 20 minutes at a pressure of between about 60 and 150 bar;
cooling the crystallization broth to a second temperature below 100° C.;
maintaining said crystallization broth at said second temperature and at atmospheric pressure to form a crystalline zeolite aluminosilicate;
recovering said crystalline zeolite aluminosilicate product from said broth.

2. The method of claim 1, which comprises heating said suspension to said first crystallization temperature in about 10 to about 120 seconds.

3. The method of claim 1, which comprises cooling said crystallization broth from said first crystallization temperature to said second temperature within a period of about 10 to about 120 seconds.

4. The method of claim 3, wherein said cooling step comprises reducing the temperature of said crystallization broth by at least 150° C. from said first crystallization temperature.

5. The method of claim 4 wherein said second temperature is about 95° C.

6. The method of claim 1 wherein said reactant suspension has the following molar proportions:

$SiO_2/Al_2O_3 = 20$ to 60

$OH/SiO_2 = 0.10$ to 0.20

$H_2O/SiO_2 = 20$ to $60$

7. The method of claim 1 wherein said reactant suspension has the following molar proportions:

$SiO_2/Al_2O_3 = 25$ to $40$ $OH/SiO_2 = 0.13$ to $0.18$ $H_2O/SiO_2 = 25$ to $40$

8. The method of claim 1 which comprises maintaining said crystallization broth at said second temperature in an open vessel.

9. The method of claim 1 which comprises maintaining said crystallization broth at said second temperature for between about 40 and about 240 hours.

10. The method of claim 1 which comprises adding up to 500% (by weight based on the $SiO_2$ content) of crystallization nuclei in the form of crystalline zeolite aluminosilicates to said crystallization broth.

11. The method of claim 1 which comprises performing said mixing step under turbulent flow conditions.

12. The method of claim 1 which comprises maintaining a Reynolds number above 2000 during said mixing operation.

13. The method of claim 12 which comprises maintaining a Reynolds number above 50,000 during said mixing operation.

14. The method of claim 3, wherein said second temperature is between about 50° C. and about 100° C.

* * * * *